Nov. 27, 1945.   G. M. FADELEY   2,389,969
ELECTRODE HOLDER
Filed Nov. 27, 1943

Inventor
GILBERT M. FADELEY
By Francis J. Klempay
Attorney

Patented Nov. 27, 1945

2,389,969

UNITED STATES PATENT OFFICE 2,389,969

ELECTRODE HOLDER

Gilbert M. Fadeley, Struthers, Ohio

Application November 27, 1943, Serial No. 511,948

9 Claims. (Cl. 219—8)

This invention relates to improvements in holders for electrodes used in electric arc welding and more particularly to improvements in holders for electrodes of the rod or stick type. The primary object of the invention is the provision of an electrode holder of the general character mentioned which is simple in design, economical to construct, and which possesses a number of definite advantages in use which will be explained in detail hereinafter.

In certain electric arc welding processes as, for example, those employing copper-bronze feed rods in connection with carbon arc electrodes for bonding rails, rebuilding brass guides, etc., and those employing consumable aluminum-bronze electrodes for welding or brazing malleable iron, etc., poisonous fumes are emitted and if inhaled by the operator for any appreciable length of time the operator becomes ill and is so incapacitated for a length of time. In accordance with the present invention I provide as an integral part of the electrode holder, or as an attachment thereto, an arrangement whereby the obnoxious fumes emitted in the welding process are rapidly withdrawn from the vicinity of the weld and discharged in a direction away from the operator. In this manner the probability of the operator inhaling such fumes is very materially lessened thereby increasing the well-being and efficiency of the operator. Another advantage of this arrangement is that the atmospheric conditions at and about the point of weld is sufficiently improved to enable the operator to more readily observe the progress of the welding with less effort.

Another specific object of the invention is the provision of an improved arrangement for cooling the parts of an arc welding electrode holder, said arrangement being preferably but not necessarily incorporated in the holder structure as an integral part thereof. Particularly in carbon arc welding a great deal of heat is evolved not only at the arc but also at the electrical connections and the current carrying parts of the holder and in accordance with the preferred embodiment of the present invention the total heat thus evolved is all carried away by a simple arrangement of passing cooling fluid over or through all these connections and parts as well as over the zone of weld.

Further specific objects of the invention include the provision of an electrode holder for electric arc welding which possesses a better balance in the hand of the user whereby definitely better results can be attained without additional effort on the part of the user, and which provides for the ready interchangeability of electrode rods of different diameters. The last object is obtainable, moreover, while yet providing for the efficient cooling of the rod and the pressure connection between the rod and the holder.

Yet another specific object of the invention is the provision of an improved support for supporting an electrode holder having certain of the characteristics outlined above, when such holder is not being actually used, whereby certain of the cooling and ventilating features normally carried along with the holder are employed in an automatic manner to cool the tip of the electrode which is secured in the holder. This apparatus and arrangement is highly advantageous, particularly in connection with carbon arc welding since the reduction in the ambient temperature of the electrode materially reduces the rate of deterioration of the tip and appears to lend greater uniformity in the subsequent striking and maintenance of the arc.

The above and other objects and advantages of the invention will become apparent upon consideration of the following detailed specification and the accompanying drawing wherein there is disclosed a preferred embodiment of the invention.

Figure 1:
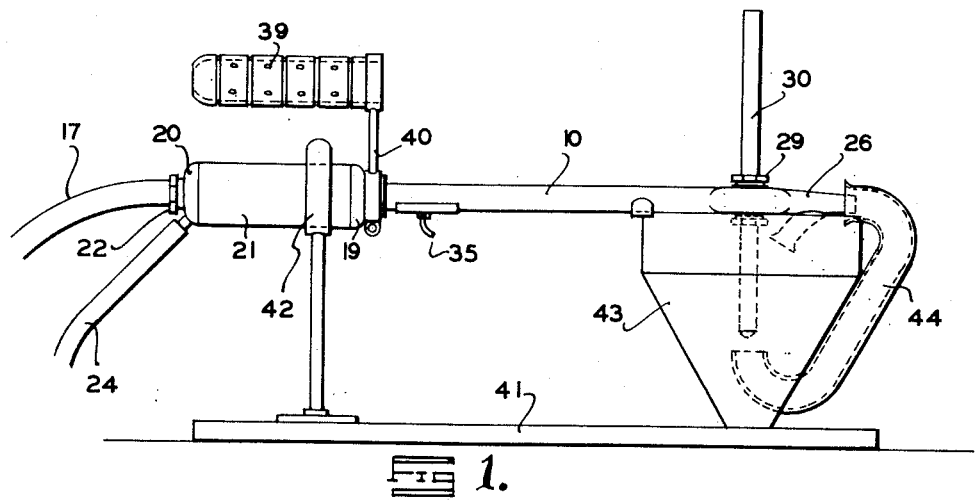
Figure 1 is a side elevation of a welding electrode holder constructed in accordance with the principles of the invention, the holder being shown as resting in and on a support therefor of novel construction.

Referring to the drawing, reference numeral 10 designates a metallic tube of suitable current carrying qualities and welded to the outer end of this tube is a pipe coupling or nipple 11. Screw-threadedly received in the outer end of the coupling 11 is a pipe bushing or reducer 12 into which, in turn, is screw threaded a length of pipe 13. An aperture is provided in the side wall of the pipe length 13 and welded to the outer surface of this length in concentric relation with the aperture is a nut 14 adapted to receive a bolt 15. The cable carrying current to the apparatus comprises, in accordance with usual practice, a flexible metallic core 16 and an outer covering of insulation 17. In assembling the apparatus the insulation is removed from the end portion of the core and this portion is then inserted in the pipe length 13 as clearly shown in Figure 2. Further, this end portion is rigidly clamped in the pipe 13 by the bolt 15 and, if desired, a shield 18 may be interposed between the outer surface of the metallic core and the inner end of the bolt 15 to distribute the forces exerted by the latter thereby further insuring the rigidity of the connection.

I provide an imperforate casing or housing about the electrical connection described above consisting of an end member 19 in which the tube 10 is tightly fitted, an opposite member 20, and an interconnecting band 21. Parts 19, 20 and 21 are preferably welded or soldered together and, as shown, the cable 16, 17 extends through a central opening in the end member 20, a grommet 22 being provided to seal the annular space between the cable and member. Extending downwardly and rearwardly from the lower portion of the end member 20 is a nipple 23 having a bore therethrough extending in the direction of the interconnection between the cable and the connector 13. A flexible hose 24 carrying air under pressure is fitted to the nipple 23 to supply cooling air to the space within the casing 19—21.

Welded to the end of tube 10 is an interiorly threaded tubular member or pipe coupling 25 the principal axis of which intersects and is normal to the principal axis of the tube 10. A second tubular member or nozzle 26 is welded to the opposite side of the coupling 25 in general continuation of the tube 10. Interconnecting the tubes 10 and 26 is a pair of arcuately curved tubes 27 passing around opposite sides of the coupling 25 and preferably in contact therewith. It should be understood, however, that the air passages thus provided by the tubes 27 may be provided equally well by suitable members which utilize the outer surface of the coupling 25 as a portion of the walls of the passages. Air is admitted into the tube 10 through a slot 28 which is positioned within the housing 19—21 and on the opposite side thereof from the inlet 23. It will be observed that this construction requires the air coming in the inlet 23 to pass over and/or about both sides of the interconnection between the current supplying cable and the electrode holder so that this interconnection as well as other adjacent parts of the holder are efficiently cooled.

Figure 2:
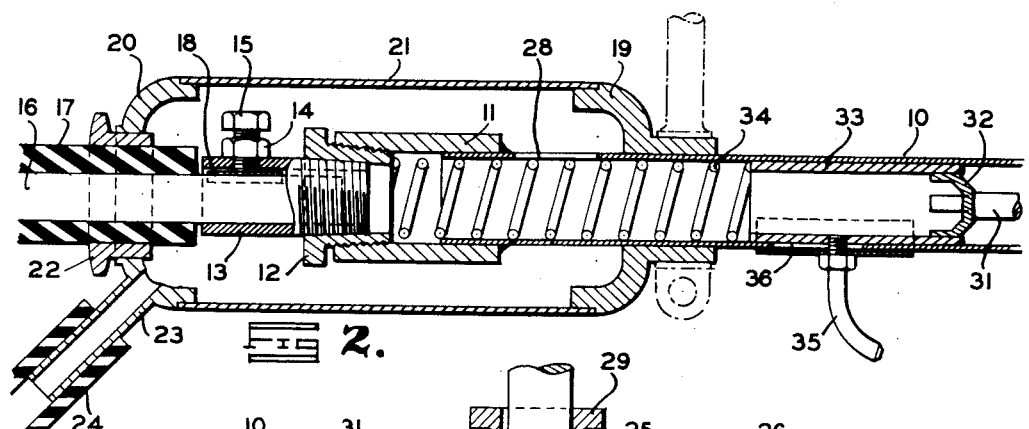
Figure 2 is a longitudinal section, on an enlarged scale, through a portion of the apparatus of Figure 1.
Figure 3:
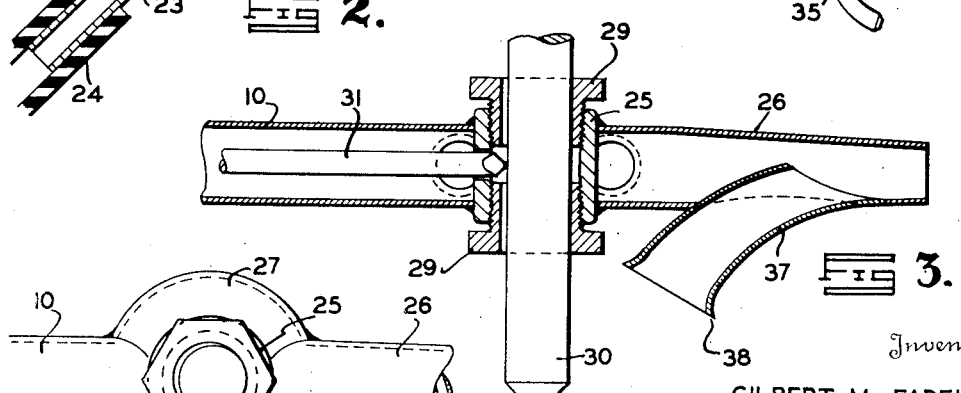
Figure 3 is a longitudinal section, on an enlarged scale, through another portion of the apparatus of Figure 1.
Figure 4:
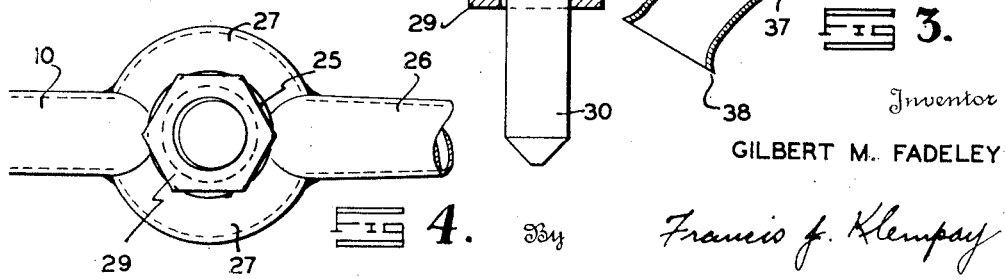
Figure 4 is a plan view of a fragmentary part of the apparatus of Figure 1.

Screw-threadedly received in opposite ends of the coupling 25 are the bushings 29 which are adapted to receive the rod or stick electrode 30. To releasably retain the electrode 30 in the bushings 29 I provide a plunger 31 which is slideably mounted in the tube 10 and the outer end of which passes through an aperture in the side wall of the coupling 25 and into engagement with the electrode as shown in Figure 3. Referring to Figure 2, the opposite end of the plunger 31 is secured to a spider 32 which, in turn, is fastened within a sleeve 33 slideably mounted in the tube 10. A coil spring 34 housed within the tube 10 and interposed between the bushing 12 and sleeve 33 is provided to maintain resilient pressure on the plunger 31 to hold the same in pressure engagement with the electrode 30. A trigger 35 connected to the sleeve 33 and extending out through a longitudinal slot 36 formed in the side wall of tube 10 provides means enabling the sleeve 33 and consequently the rod 31 to be retracted thus releasing the electrode 30.

A curved tube 37 having a bell-shaped inlet end 38 is attached to the tube 26 in such manner that the air moving through to tubes 10, 27 and 26 in series will create a suction in the tube 37 to withdraw air and gases from above the inlet 38 and comingle the same with the air stream passing out of the tube 26. It will be observed that the inlet 38 to the tube 37 is directed toward and is adjacent the operating or arc end of the electrode 30. The holder also includes a handle 39 which is maintained parallel with but spaced above the housing 19—21 by a bracket 40 which is clamped onto an integral shank of the end member 19 of this housing.

With the parts of the holder assembled in the manner indicated and the cable 16 connected to a suitable source of welding current while the conduit 24 is connected to a suitable source of air under pressure, it will be understood that the holder thus provided may be readily wielded by grasping the handle 39 to bring the tip of the electrode 30 into arcing position with respect to the work to be welded. I have found that the holder thus constructed is well balanced about the handle 39, the weight of the housing 21 and contents as well as the weight of the suspended portions of the electric cable and air line being offset by the weight of the extended tube 10 and electrode 30 thereby enabling the holder to be manipulated for long periods of time without undue fatigue. Inasmuch as the flow of electricity along a conductor is pretty much concentrated at the exposed surfaces of the conductor the tube 10 provides an efficient current carrying support which at the same time is light in weight as well as possessing the further advantage of housing the releasable means for retaining the electrode in the holder. It should be observed that the design of the parts which contact, i. e. the bushings 29 in the specific embodiment illustrated, is such that current transmitting surfaces of substantial area are brought into pressure contact with the electrode thus minimizing any tendency to local arcing and minimizing local heating. While the same bushings 29 may be employed to hold electrodes of varying diameters, it is desirable in most instances to employ bushings having small internal diameters for the smaller diametered electrodes. The exposed nature of the flanges of these bushings enable such changes to be readily effected.

The passage of air through or about all the principal parts and connections of the assembly maintains the assembly in a cool efficient operating condition. This is especially true as regards the electrical connections between the holder and the electrode which connections normally evolve such quantities of heat as to heretofore rapidly heat the holder to dangerously high temperatures. In the holder described herein the cooling of these connections is positive and efficient and the evolved heat is rapidly carried away with the air stream and discharged from the nozzle 26 in a direction away from the operator or user. The heat exchange between the metallic parts which are in contact with and/or closely adjacent to the electrode 30 is especially efficient due to the adjacent circuitous paths of the air stream over the outer surfaces of these parts. As stated above, the action of the air stream in the nozzle 26 in conjunction with the tube 37 provides an efficient aspirator which is operative to rapidly withdraw the gases or fumes which evolve from the zone of weld adjacent the tip of the electrode 30 and to mix the same with the air stream which is ejected from the nozzle 26 in a direction away from the operator as pointed out above. In this manner the welder using the apparatus of the invention can observe his work quite closely without danger of inhaling the obnoxious or poisonous fumes arising from the welding process. Moreover, the rapid withdrawal of the gases and fumes from the welding zone increases the welder's ability to observe what is taking place thereby further facilitating his work.

As pointed out above, it is generally desirable to keep the electrode cool and this is particularly true in the case of carbon electrodes where the lower transmission coefficient makes for slower cooling of the electrode. The electrode is continuously cooled in the holder of the present invention regardless of whether the holder is in actual use, is being held idle by the welder, or is simply laid down since the air stream passing around the point of connection between the holder and the electrode cools the upper end of the effective length of the electrode while the projecting end of such length is cooled by the air stream created by the aspirator 37. To provide for the more rapid cooling of the tip of the electrode and to provide also a convenient support to retain the assembled holder and electrode when not in use I preferably employ the supporting apparatus shown in Figure 1 of the drawing. Such further apparatus consists of any suitable base or support 41 to which is secured a saddle 42 adapted to receive the housing member 21 of the holder proper. Also supported on the base 41 is a conically-shaped open-topped receptacle 43 across the top of which may be laid the tube 26 and a portion of the tube 10. This positions the electrode 30 centrally within the receptacle 43. Extending from the top edge of the receptacle, down along one side thereof, and thence upwardly in the center thereof is a tube 44 which is operative to conduct the air stream issuing from the nozzle 26 into direct impingement with the end or tip of the electrode 30 as indicated in Figure 1. In this manner the tip of the electrode is rapidly cooled between welding operations and in practice the cooled electrode presents the advantages of facilitating the initiation of the arc and of materially reducing the rate of deterioration of the electrode, if of carbon.

It should now be apparent that I have provided an improved arc welding electrode holder which accomplishes the objects initially set out. The attainment of these objects, principally as they concern the cooling of the parts of the holder and the electrode does not, however, necessitate a heavy or unwieldy instrument. In fact, the weight of the present holder is considerably less than those now in general commercial use and the spaced positioning of the handle 29 lends a nicety of balance to the assembly thereby supplementing more effectively the personal skill of the welder employing the assembly.

The above specifically described embodiment of the invention should be considered as illustrative only as obviously many changes may be made therein without departing from the spirit or scope of the invention. Reference should therefore be had to the appended claims in determining the scope of the invention.

What I claim is:

1. An electrode holder comprising in combination a tubular current conductive member, electrical connecting means secured to one end of said member and adapted to be connected to a current conductive cable, a housing about said means and the adjacent end portion of said member, a handle, current conductive means secured to the other end of said member to retain a welding electrode, means to conduct cooling fluid into said housing, and a passage providing intercommunication between the space within said housing and the space within said member whereby said cooling fluid is conducted through said member and into heat exchanging relation with said second mentioned means.

2. Apparatus according to claim 1 further including a second tubular member providing a continuation of the confined fluid passage through said first mentioned member on the side of said second mentioned means opposite said first mentioned tubular member.

3. Apparatus according to claim 1 further including a second tubular member providing a continuation of the confined fluid passage through said first member on the side of said second mentioned means opposite said first mentioned member, and a curved aspirator tube having an inlet directed toward the tip of an electrode held in said second mentioned means and an outlet discharging into said last mentioned fluid passage.

4. A support adapted to receive a portable electrode holder having a current and coolant conducting tube with the discharge end thereof positioned on the opposite side of the electrode from the hand grip portion of the holder comprising means to engage said tube and means providing a curved fluid conducting passage having its inlet positioned at the discharge end of said tube and its outlet positioned adjacent the tip of the electrode held in said holder when said holder is in position on said support whereby coolant furnished said holder may be caused to impinge on said tip.

5. An electrode holder comprising in combination a current conductive tubular element, a hollow fitting extending across the outer end of said tubular element and secured thereto, current conductive interchangeable bushings detachably secured in either end of said fitting and adapted to receive an elongated electrode, a plunger in said tubular element to engage said electrode, yieldable means in said tubular element, urging said plunger into yieldable pressure engagement with said electrode, and a manually engageable element secured to said plunger and extending outwardly through an opening in the side wall of said tubular element for retracting said plunger.

6. An electrode holder comprising in combination a current conductive tubular element, current conductive bushings detachably secured in either end of said element and adapted to receive an elongated electrode, a tube connected to said element for supporting the same, a second tube positioned on the opposite side of said element in general continuation of said first mentioned tube, means to conduct cooling fluid into the end of said first mentioned tube opposite the end thereof adjacent said element, and means to conduct said cooling fluid into heat exchanging relation with the outer surface of said element comprising metallic means providing a fluid passage interconnecting said tubes.

7. An electrode holder comprising in combination an elongated current conductive support having a handle adjacent one end thereof and means to retain an electrode adjacent the other end thereof, means to connect a welding current conductive cable to said support, and fluid conducting means carried by said support and including an aspirator operative to withdraw the atmospheric gases from a zone surrounding the operative tip of said electrode and to discharge the same in a direction away from said handle, said means to conduct fluid being positioned in heat exchanging relation with said support and said first and second mentioned means whereby said holder is cooled simultaneously with operation of said gas withdrawing and discharging means.

8. In a portable electrode holder having a handle and means to retain an electrode the combination of a fluid conduit having a discharge end positioned on the opposite side of said retaining means from said handle and directed away from said handle, means to conduct fluid under pressure into said conduit, and an aspirator tube having its inlet end directed toward the tip of the electrode held in said retaining means and its outlet end discharging into said conduit.

9. An electrode holder comprising in combination an elongated current conductive support having means at one end to detachably receive a welding electrode and means in said support to releasably retain said electrode, means at the other end of said support to attach a current conductive cable thereto, and a handle spaced from but extending generally parallel with the end portion of said support adjacent said cable connecting means, said handle being secured to said support by a strut extending from the end of said handle which is closest said electrode receiving means of said support.

GILBERT M. FADELEY.